US008498774B2

(12) United States Patent
Schurov

(10) Patent No.: US 8,498,774 B2
(45) Date of Patent: Jul. 30, 2013

(54) METHOD FOR TRANSMISSION OF DATA CONCERNING TRANSPORT MEANS IN TRANSPORT MONITORING SYSTEMS

(76) Inventor: Andrey Schurov, Chelyabinsk (RU)

(*) Notice: Subject to any disclaimer, the term of this patent is extended or adjusted under 35 U.S.C. 154(b) by 47 days.

(21) Appl. No.: 13/349,578

(22) Filed: Jan. 13, 2012

(65) Prior Publication Data

US 2012/0123631 A1 May 17, 2012

Related U.S. Application Data

(63) Continuation-in-part of application No. PCT/RU2011/000395, filed on Jun. 8, 2011.

(30) Foreign Application Priority Data

Jul. 2, 2010 (RU) ................................ 2010127419

(51) Int. Cl.
*G06F 7/00* (2006.01)

(52) U.S. Cl.
USPC .............................................. 701/31.5; 701/1

(58) Field of Classification Search
USPC ........................................ 701/408–412, 31.5
See application file for complete search history.

(56) References Cited

U.S. PATENT DOCUMENTS 7,554,441 B2 * 6/2009 Viegers et al. ........... 340/539.22
7,880,609 B2 * 2/2011 Viegers et al. ........... 340/539.22

FOREIGN PATENT DOCUMENTS

RU 2157565 C1 10/2000
RU 2243594 C2 12/2004

* cited by examiner

*Primary Examiner* — Matthew Daniels
*Assistant Examiner* — Allen E Quillen
(74) *Attorney, Agent, or Firm* — Patent Jurist; Georgiy L. Khayet

(57) ABSTRACT

Provided is a method for transportation asset monitoring. In one example embodiment, the method comprises collecting data related to operation and location of a transportation asset, comparing the collected data with values of one or more predetermined parameter thresholds, and generating an alarm signal whenever the one or more predetermined parameter thresholds have been exceeded. The method may further comprise generating a report related to the transportation asset's operational characteristics and performance output.

19 Claims, 6 Drawing Sheets

METHOD FOR TRANSMISSION OF DATA CONCERNING TRANSPORT MEANS IN TRANSPORT MONITORING SYSTEMS

CROSS-REFERENCE TO RELATED APPLICATIONS

This application is a Continuation-in-Part and claims priority of Russian application No. 2010127419, entitled "METHOD FOR TRANSMISSION OF DATA CONCERNING LOCATION AND STATE OF TRANSPORTATION ASSETS IN TRANSPORT MONITORING SYSTEMS", filed on Jul. 2, 2010 and PCT application No. PCT/RU2011/000395 entitled "METHOD FOR TRANSMITTING DATA RELATING TO THE LOCATION AND STATUS OF VEHICLES IN TRANSPORT MONITORING SYSTEMS," filed on Jun. 8, 2011, both of which are incorporated herein by reference in their entirety for all purposes.

FIELD

This application relates generally to data processing and, more specifically, to methods for transmission of data concerning transportation assets.

BACKGROUND

There is a diverse number of transport monitoring methods designed to increase the efficiency of transportation asset control centers, thereby preventing loss of fuel and other materials and precluding improper use of transportation assets. These systems are generally based on the same principle of collecting data from various sensors, installed on a transportation asset, which include a satellite navigation receiver, and transmitting the collected data to data storage via a public radio network, most often, a cellular network. The necessity of transmitting the entire amount of the data used in controlling of the transportation asset, even when the coordinates of the transportation asset and monitored operational characteristics remain unchanged, results in an unreasonably large volume of the data to be transmitted via the public radio network. This, in turn, makes using existing systems rather expensive because of the large amount of traffic that is generated. Furthermore, public radio networks oftentimes get overloaded.

The above holds true even for the more advanced of the existing methods for monitoring transportation assets, such as, for example, the method wherein a moving transportation asset receives navigation signals from the satellites of a global navigation system, such as, for example, the Global Positioning System (GPS). The location, speed and time of the transportation asset are identified and a data packet is formed containing a number code of the transportation asset and the state of its sub-systems. The data is periodically received by a transportation asset control center in the form of an electrical signal via a public radio network, processed, stored, and displayed on an electronic map. In case of an emergency, the transportation asset control center forms and sends to the transportation asset an appropriate message in the form of an information packet via a public radio network. When the message is received by the transportation asset, some of its controlling sub-systems are activated or deactivated, or bidirectional voice communications are established via a cellular network. The method includes regularly transmitting of the full volume of the data associated with the location and operation of the transportation asset, thereby necessitating generation of a large amount of traffic.

In addition to the above, some of the existing methods for monitoring transportation assets are encumbered by a limited scope of application. For example, there is a method that is based on storing a security code to the memory of a transportation asset controller. The security code is transmitted to the transportation asset control center when the transportation asset is abandoned by the driver and is taken as a signal to secure the transportation asset for a predetermined period of time. If the transportation asset moves during the predetermined period of time, a theft code identifier is added to the data transmitted to the transportation asset control center. Such method has limited applications.

SUMMARY

This summary is provided to introduce a selection of concepts in a simplified form that are further described below in the Detailed Description. This summary is not intended to identify key features or important features of the claimed subject matter, nor is it intended to be used as an aid in determining the scope of the claimed subject matter.

Provided are methods and systems for transmission of data concerning transport means in transport monitoring systems. In some embodiments, the method for transmission of data concerning transport means in transport monitoring systems may be based on forming of data packets that include data related to coordinates of the transportation asset, the current date and time, and the state of the individual sub-systems of the transportation asset.

In some embodiments, the data packets of two different types may be formed, including, respectively, absolute and relative data values.

In some embodiments, the method for transmission of data concerning transport means in transport monitoring systems may comprise the transformation of the data packets into an electrical signal and discrete real-time transmission of the signal to the transportation asset control center.

In some embodiments, the data packets may be transmitted to the transportation asset control center based on predetermined transmission criteria.

In some embodiments, the data provided in the data packets may be compared with predetermined absolute values to determine if the one or more predetermined parameter thresholds have been exceeded.

In further exemplary embodiments, modules, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
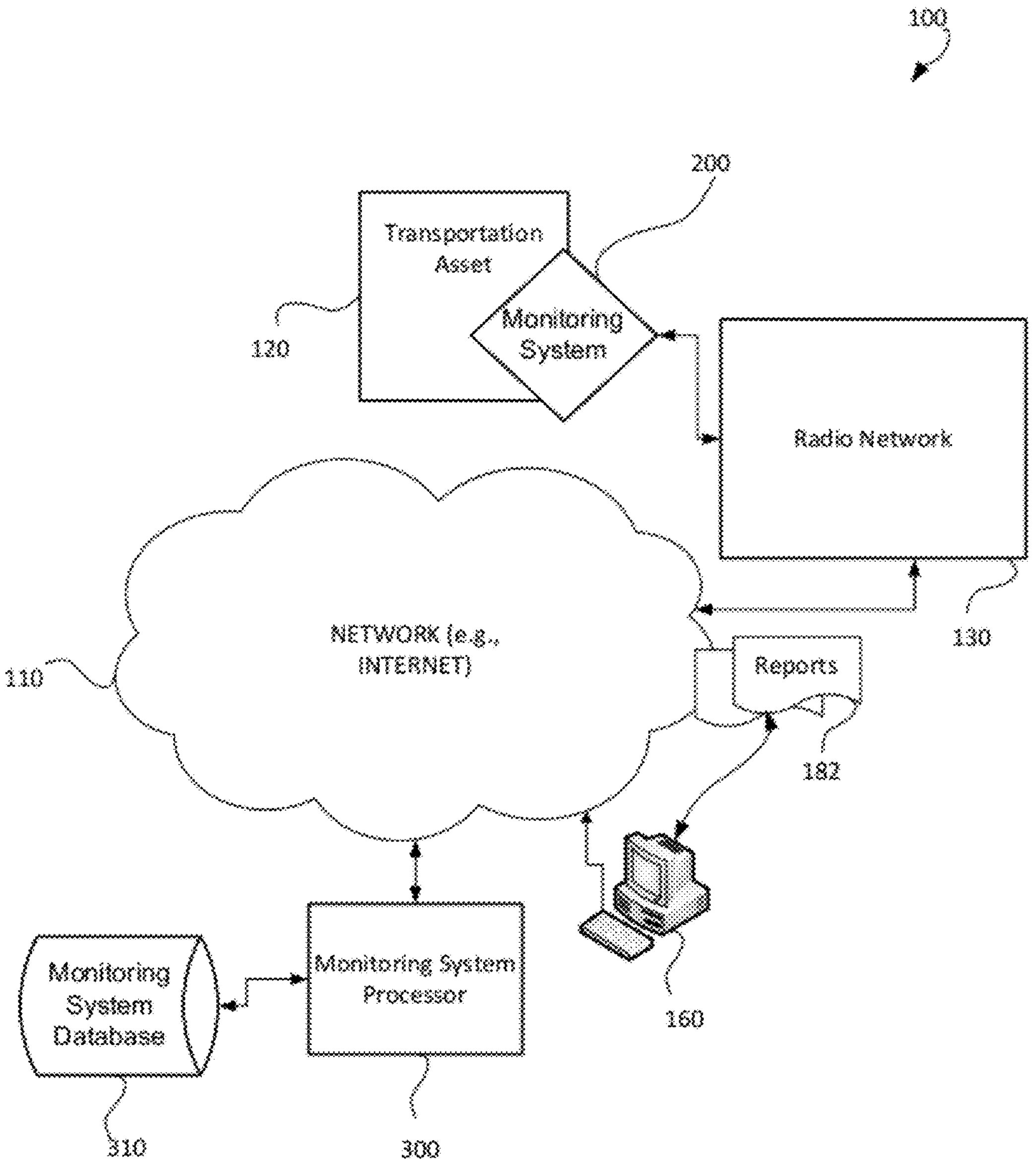
FIG. 1 shows a block diagram illustrating a system environment suitable for monitoring a transportation asset using the method described herein.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter.

The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls. In accordance with various embodiments and the corresponding disclosure thereof, a computer-implemented methods and systems for monitoring a transportation asset have been provided.

In some embodiments, two types of data packets may be created: support data packets and intermediate data packets, which may contain, respectively, absolute and relative data values. The relative data values reflect changes that take place in monitored transportation asset-related parameters since the last support data was transmitted. During transportation asset usage, the period of time when the transportation asset is moving from one point to another does not necessarily coincide with the period of time when changes in other parameters can take place: the transportation asset may be standing idle with the main or auxiliary engine running, the temperature may vary during the stop, and so forth. Thus, oftentimes, it is possible to dispense with transmitting the absolute values and provide relative values, thereby reducing the amount of traffic generated and the load on the radio network used.

In some embodiments, support data packets may contain all current sensor-provided operational data related to the transportation asset, including the coordinates of the transportation asset and state of its individual sub-systems as well as full current date and time. The support data packets may be transmitted to the transportation asset control center regardless of the condition of the transportation asset.

In some embodiments, the frequency with which support data packets are transmitted may vary depending on a specific task. Normally, it should be sufficient to transmit the support packet once every 3-5 minutes.

In some embodiments, the quantity of the support data packets may be limited by the minimum data transmitting period to prevent a mobile telematics terminal (MTT) from generating excessive traffic. For example, suitable values for the minimum data transmitting period may be 1 second for alarm systems, 5 seconds for commercial transport monitoring systems, and so forth.

In some embodiments, intermediate data packets may contain changes to the values of the sensor-provided data and the time increase associated with these changes in relation to the previous support data packet, or changes in the coordinates' values and the time increase associated with these changes in relation to the previous support data packet.

In some embodiments, the intermediate data packets may be transmitted to the transportation asset control center when the one or more predetermined parameter thresholds have been exceeded. Generation of the next intermediate packet may not be triggered by any change in the state of a sensor state if the one or more set predetermined parameter thresholds are not exceeded. For example, if the predetermined parameters threshold is set at 10 meters, and the distance of the movement of a transportation asset is only 5 meters, no intermediate packet is generated, although the next support packet will report the new location correctly.

In some embodiments, the predetermined parameter threshold may be defined for each data type individually. In some embodiments, data packets of both support and intermediate types may be transmitted to the transportation asset control center over a radio network, most often, a cellular network.

In some embodiments, to reduce the load on the radio network, data that is used to form data packets of both types, may be stored to a mobile telematics terminal database until the volume of the data meets a volume-based billing threshold of a radio network, or until a maximum volume that can be transmitted in a single data packet over a given type of a radio network is reached.

In some embodiments, over-time differences in transportation asset-related data may be transmitted to the transportation asset control center instead of the full volume of the data in order to reduce the load on the radio network used. The over-time differences in the transportation asset-related data may be transmitted in the intermediate data packets.

In some embodiments, the size of data fields may be determined based on the highest possible data values. For example, if the transmission of a support packet occurs once every three minutes, 1 may be a sufficient size with the precision of transmission of time data of 1 second, as 256 different values can be transmitted in 1 byte, and 3 minutes equal 180 seconds.

In some embodiments, if no events reported by MTT-connected sensors, which are set to monitor the transportation asset, occur in between the transmissions of the support packets, such as, for example, movements of the transportation asset from one point to another, voltage changes at the entry points, or value-associated changes exceeding the one or more predetermined parameter thresholds, the intermediate packets may not be transmitted.

In some embodiments, relative time values, relative values of the coordinates and relative values of other data may be transmitted in the intermediate data packets. The time may be transmitted in each intermediate data packet accompanied by other data. In some embodiments, the transportation-asset-related data may be rendered on an electronic map.

In some embodiments, an alarm signal may be generated and transmitted to the transportation asset control center if the one or more predetermined parameter thresholds have been exceeded.

In some embodiments, a report containing the operational characteristics and performance output of the transportation asset may be generated based on the sensor-provided data.

Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

Referring now to the drawings, FIG. 1 shows a block diagram illustrating a system environment 100 suitable for monitoring a transportation asset. The system environment 100 may comprise a client device 160. The client device 160 may include a computer or a laptop. In some embodiments, the client device 160 may be a mobile device. A mobile device may include a tablet computer, a handheld cellular phone, a mobile phone, a smart phone, a Personal Digital Assistant (PDA), a handheld device having wireless connection capability, or any other electronic device. The client device 160 can be coupled to a printing capability, such as reports 182. The system environment 100 may further include a monitoring system 200, which is installed on the transportation asset 120, a processor 300 of the monitoring system 200, and a database 310. The client device 160 may be coupled to the monitoring system 200 using a network 110 via the radio network 130.

Figure 2:
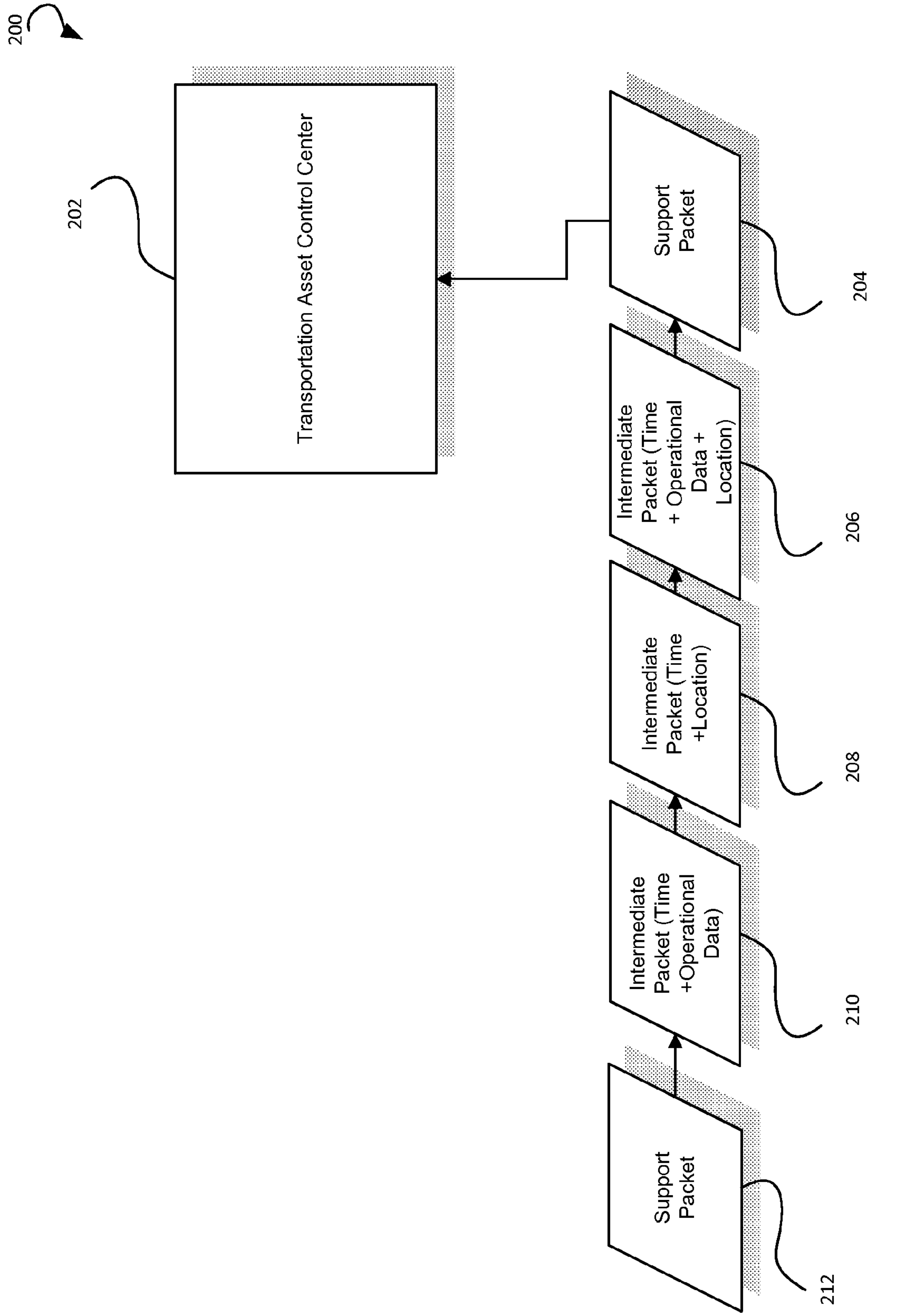
FIG. 2 is a flowchart illustrating the order in which the support and intermediate data packets may be transmitted to the transportation asset control center.

FIG. 2 is a flowchart 200 illustrating an example order in which the support and intermediate data packets can be transmitted to the transportation asset control center 202. The support data packet 204 may be followed by the intermediate packet 206 containing the time and the data related to the location and operation of the transportation asset. The intermediate data packet 206 may be followed by the intermediate data packet 208 which contains the time and data related to the location of the transportation asset. Next, the intermediate data packet 210 containing the time and the data associated with the operation of the transportation asset may be transmitted, and, finally, the support data packet 212, which completes the transmission cycle, may be transmitted.

Figure 3:
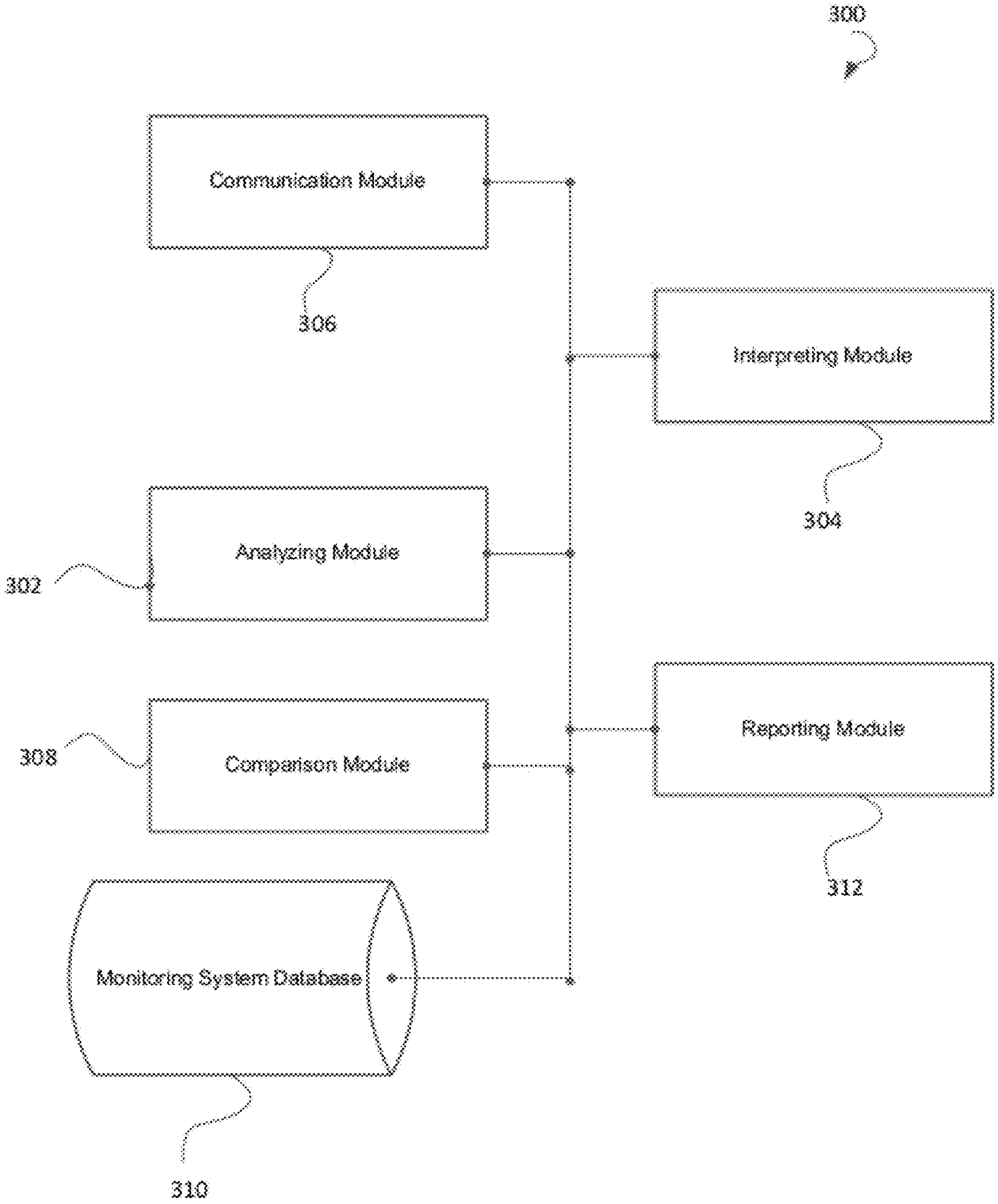
FIG. 3 shows a processor of the system for monitoring the transportation asset.

FIG. 3 shows a block diagram of the processor 300 of the monitoring system 200. The interpreting module 304 may receive the operational data of the transportation asset from the mobile telemetric terminal (MTT)-connected sensors, identifying the current operational characteristics of the transportation asset and storing the data to the database 310 of the monitoring system. Further, the data may be analyzed by the analyzing module 302 to determine values of one or more parameters associated with the transportation asset. After the values of the one or more parameters associated with the transportation asset are determined, the comparison module 308 may compare the values with values of one or more predetermined parameter thresholds, and, if the one or more predefined parameter thresholds have been exceeded, inform the communication module 306 accordingly. If the latter is the case, the communication module 306 may generate an alarm signal and transmit the signal to the transportation asset control center. If desired by the user, the reporting module 312 may generate a report related to the operational characteristics and performance output of the transportation asset.

Figure 4:
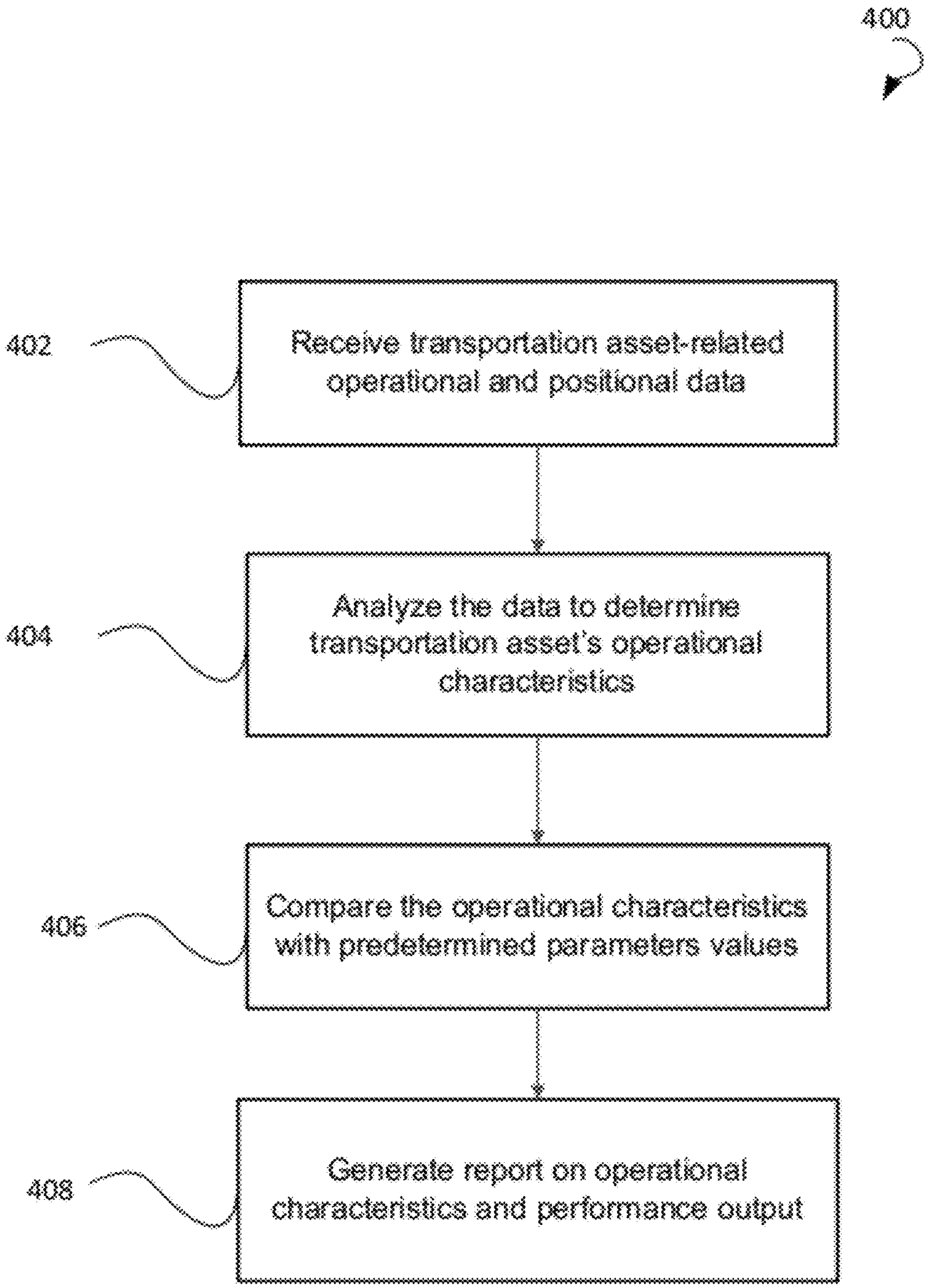
FIG. 4 is a process flow diagram showing a method for monitoring the transportation asset.

FIG. 4 is a process flow diagram showing a method 400 for processing sensor-provided transportation asset-related data by the processor 300, according to an exemplary embodiment. The method 400 may be performed using the various modules discussed above with reference to FIG. 3. Each of these modules may include processing logic. Although the various modules may be configured to perform some or all of the various steps described herein, fewer or more modules may be provided and still fall within the scope of the exemplary embodiments.

The method 400 may be performed by processing logic that may comprise hardware, software (such as software run on a general-purpose computer system or a hand-held device), or a combination of both.

As shown in FIG. 4, the method 400 may commence at operation 402 with receiving the transportation asset-related data, including the location of the transportation asset and at least data related to the operation of the transportation asset. At operation 404, the received location-related and operational data may be analyzed to determine the operational characteristics of the transportation asset. At operation 406, the operational characteristics of the transportation asset may be compared with the values of the one or more predetermined parameter thresholds stored in the database 310 to determine whether the one or more predetermined parameter thresholds have been exceeded. Finally, a report containing the operational characteristics and performance output of the transportation asset may be generated at operation 408.

Figure 5:
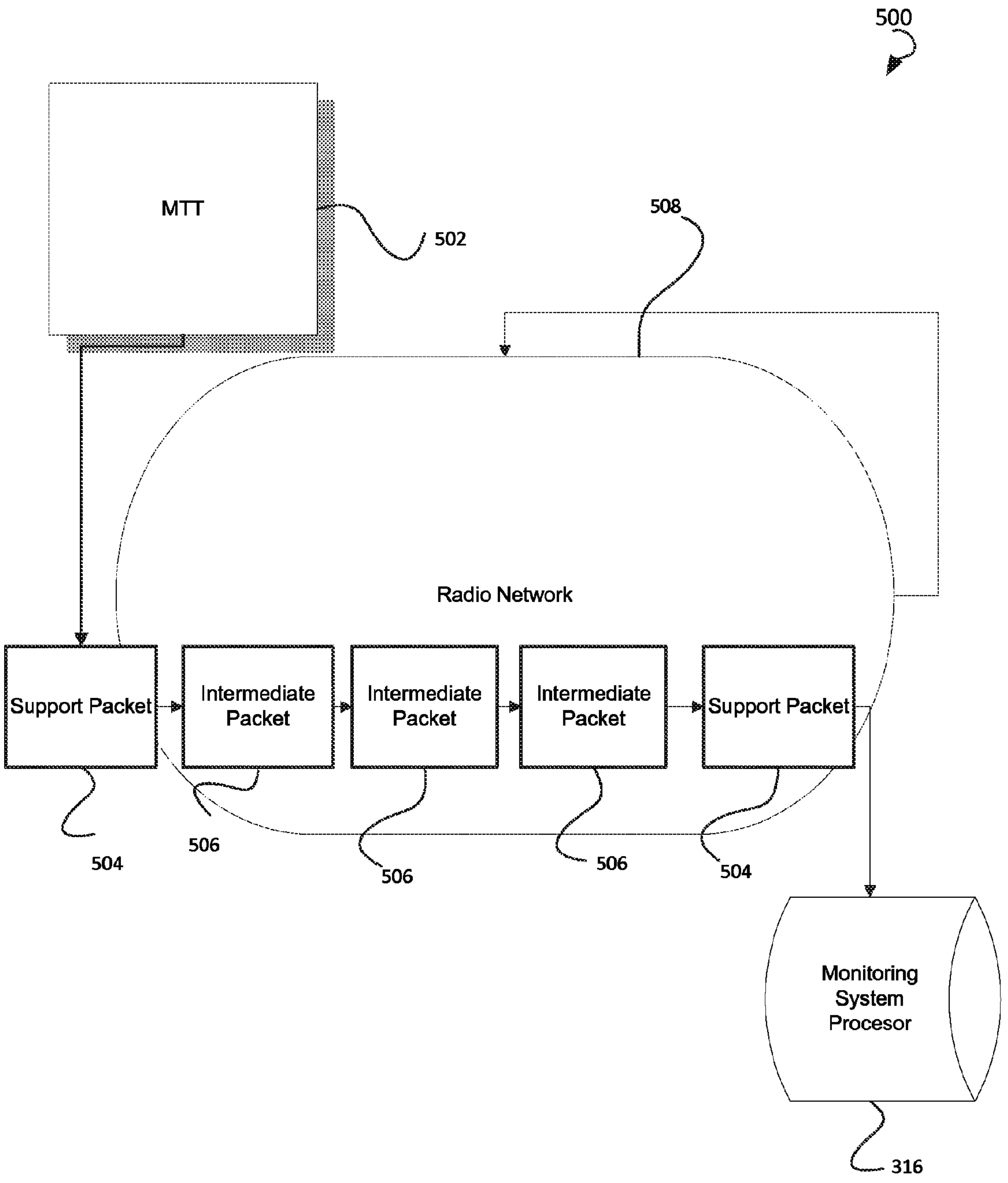
FIG. 5 is a diagram of the process of transmission of the transportation asset-related data to the transportation asset control center.

FIG. 5 is a diagram illustrating the process of the transmission of the transportation asset-related data transmission to the transportation asset control center 202. The MTT 502 may intermittently generate the support 504 and intermediate 506 data packets. In accordance with the predetermined transmission criteria for each of the data packet types, the data packets 504, 506 are transmitted via a radio network 508 to the processor 316 of the monitoring system 200.

Figure 6:
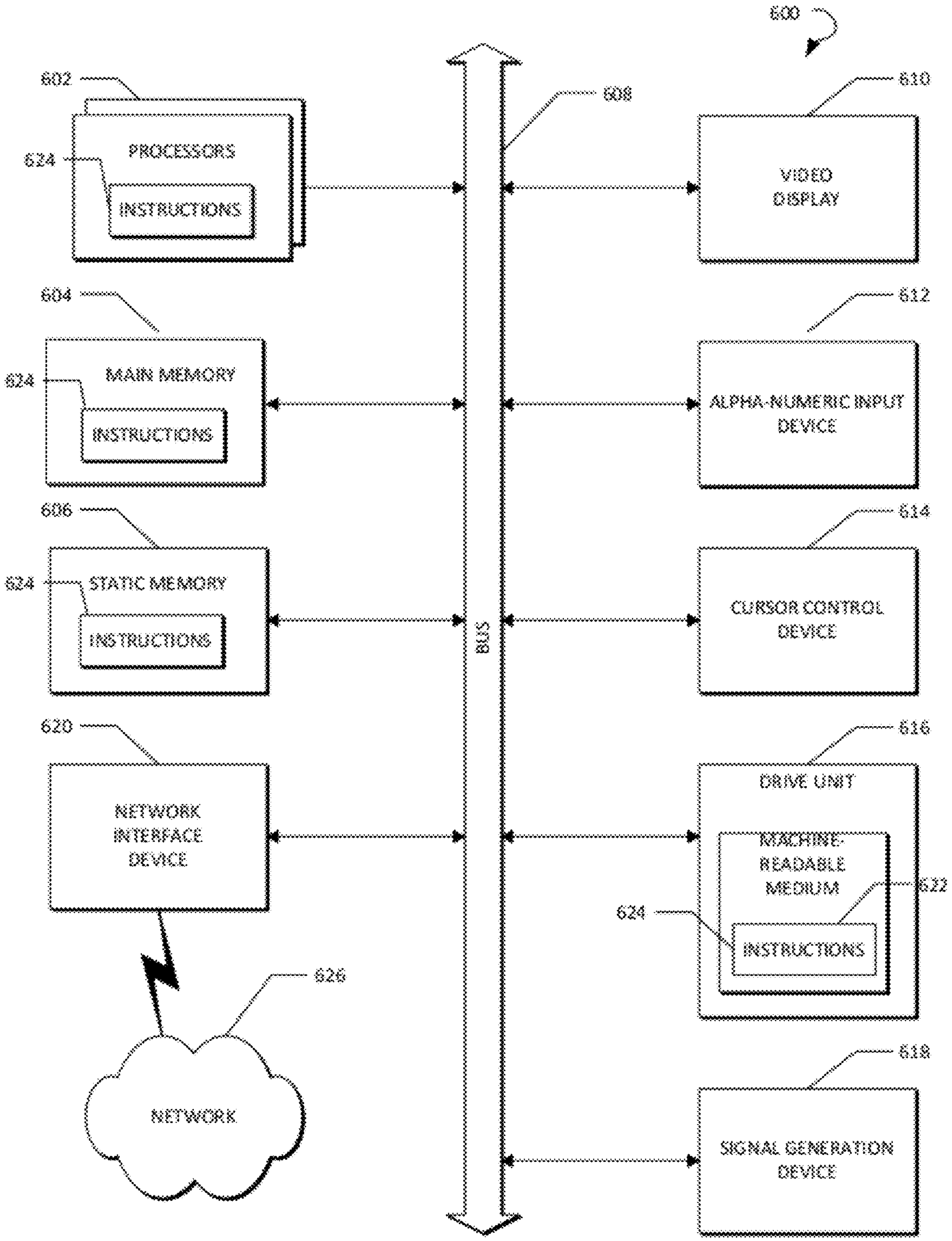
FIG. 6 shows a diagrammatic representation of a computing device for a machine in the example electronic form of a computer system 600, within which a set of instructions for causing the machine to perform any one or more of the methodologies discussed herein can be executed.

FIG. 6 shows a diagrammatic representation of a computing device for a machine in the example electronic form of a computer system 600, within which a set of instructions for causing the machine to perform any one or more of the methodologies discussed herein can be executed. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a PDA, a cellular telephone, a portable music player (e.g., a portable hard drive audio device, such as a Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term “machine” shall also be taken to include any collection of machines that individually or jointly execute a set (or multiple sets) of instructions to perform any one or more of the methodologies discussed herein.

The example computer system 600 includes a processor or multiple processors 602 (e.g., a central processing unit (CPU), a graphics processing unit (GPU), or both), and a main memory 604 and a static memory 606, which communicate with each other via a bus 608. The computer system 600 can further include a video display unit 610 (e.g., a liquid crystal displays (LCD) or a cathode ray tube (CRT)). The computer system 600 also includes at least one input device, such as an alphanumeric input device 612 (e.g., a keyboard), a cursor control device 614 (e.g., a mouse), a microphone, and so forth. The computer system 600 also includes a disk drive unit 616, a signal generation device 618 (e.g., a speaker), and a network interface device 620.

The disk drive unit 616 includes a machine-readable medium 622, which stores one or more sets of instructions and data structures (e.g., instructions 624) embodying or utilized by any one or more of the methodologies or functions described herein. The instructions of 606 and 622 can also reside, completely or at least partially, within the main memory 604 and/or within the processors 602 during the execution thereof by the computer system 600. The main memory 604 and the processors 602 also constitute machine-readable media.

The instructions 624 can further be transmitted or received over the network 626 via the network interface device 620 utilizing any one of a number of well-known transfer protocols (e.g., Hyper Text Transfer Protocol (HTTP), CAN, Serial, and Modbus).

While the machine-readable medium 622 is shown in an example embodiment to be a single medium, the term "computer-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "machine-readable medium" shall accordingly be taken to include, but not be limited to, solid-state memories, optical and magnetic media. Such media can also include, without limitation, hard disks, floppy disks, flash memory cards, digital video disks, random access memory (RAMs), read only memory (ROMs), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, methods and systems for online price quoting are disclosed. The methods and systems allow getting instant estimates of a price, turnaround time, and other information related to any desired services in a quick and convenient way. The estimation is performed automatically based on the user input and the predetermined settings of the registered service providers and delivered via a network, such as the Internet.

Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for monitoring of a transportation asset over a communication network, using a computing system including sensors that collect operational data, a memory that stores the operational data and machine instructions, the method comprising:

forming, by the computing system, a support data packet, the support data packet including information indicative of values of parameters associated with a state of the transportation asset, wherein the support data packet includes all absolute sensor-provided operational data related to the transportation asset, including coordinates of the transportation asset, a state of individual subsystems associated with the transportation asset, and a full current date and time;

transmitting, by the computing system, the support data packet over the communication network to the transportation asset control center based on predetermined criteria for periodical transmission of support data packets, wherein the support data packet is transmitted to the transportation asset control center regardless of conditions associated with the transportation asset;

determining, by the computing system, that one or more changes in the values of the parameters associated with the state of the transportation asset exceed one or more predetermined parameter thresholds associated with respective parameters since the transmission of the support data packet;

based on the determination, selectively forming, by the computing system, an intermediate data packet, wherein the formation of the intermediate packet is not triggered unless the one or more predetermined parameters thresholds are exceeded, the intermediate data packet including a time increase associated with the formation of the intermediate data packet and the one or more over-time differences of changes in values of the parameters, wherein besides the time increase associated with the formation of the intermediate data packet, the intermediate data packet includes only relative sensor-provided data in relation to the absolute sensor-provided data transmitted in the support data packet;

and selectively transmitting, by the computing system, the intermediate data packet to the transportation asset control center over the communication network.

2. The method of claim 1, wherein the communication network includes one or more of the following: a cellular network, VHF/UHF radio network, a satellite network, and a short-range wireless network.

3. The method of claim 1, further comprising transmitting an alarm signal to the transportation asset control center based on predetermined alarm criteria associated with the one or more changes in the values of the one or more parameters.

4. The method of claim 1, wherein the support data packets and intermediate data packets are aggregated into data arrays prior to transmission to the transportation asset control center until the respective data arrays exceed a volume-based billing threshold associated with the communication network.

5. The method of claim 1, wherein the transportation asset control center utilizes the support data packets and intermediate data packets received from the one or more transportation assets for visualization on an electronic map.

6. The method of claim 1, wherein the values of the one or more parameters are based on sensor data provided by one or more sensors installed on the transportation asset.

7. The method of claim 1, wherein sizes of data fields for transmission of the values of the one or more parameters are based on respective highest possible data values of the one or more parameters.

8. The method of claim 1, wherein a quantity of the support data packets is based on a minimum data transmitting period.

9. The method of claim 1, wherein a frequency of transmissions of the support data packets is based on settings associated with a specific task performed by the transportation asset.

10. The method of claim 1, wherein the one or more parameters include one or more of the following: a time, a location, a speed of a transportation asset, fuel consumption of the transportation asset.

11. The method of claim 2, wherein the location is determined based on signals received from one or more satellites of a satellite navigation system.

12. The method of claim 1, further comprising validation of the transmissions of the support and intermediate data packets to the transportation asset control center.

13. The method of claim 1, wherein over-time changes in transportation asset-related data are transmitted in the intermediate data packet instead of the support data packet.

14. The method of claim 1, wherein the data to be transmitted to the transportation asset control center is stored to a mobile telematics terminal (MTT) database until a maximum data volume that is transmitted over the communication network is reached.

15. The method of claim 1, wherein the one or more predefined parameter thresholds are defined individually for each data type.

16. The method of claim 1, wherein the transportation asset control center utilizes the data transmitted in the data packets received from one or more transportation asset for generating a report on the one or more transportation assets' operational characteristics and performance output.

17. A system for monitoring of a transportation asset, the system comprising:

a data packet generator to selectively form one or more support and intermediate data packets, wherein the support data packets include information indicative of values of parameters associated with a state of the transportation asset and all absolute sensor-provided operational data related to the transportation asset, including coordinates of the transportation asset, a state of individual sub-systems associated with the transportation asset, and a full current date and time, and wherein the intermediate data packets include a time increase associated with the formation of the intermediate data packet and the over-time differences of one or more changes in values of the parameters, wherein besides the time increase associated with the formation of the intermediate data packet, the intermediate data packet includes only relative sensor-provided data in relation to the absolute sensor-provided data transmitted in the support data packet;

a sensor monitoring module to receive sensor data related to operation of transportation asset from one or more sensors installed on the transportation asset;

an analyzing module to analyze the sensor data to determine values of one or more parameters associated with the transportation asset;

a comparison module to determine one or more changes in the values of the parameters associated with the state of the transportation asset; and a communication module to selectively transmit the support data packet over the communication network to the transportation asset control center based on predetermined criteria for periodical transmission of the support data packets, wherein the support data packets are transmitted to the transportation asset control center regardless of conditions associated with the transportation asset, and to selectively transmit the intermediate data packet to the transportation asset control center over the communication network, the intermediate data packets being formed based on the over-time differences of one or more changes in the values of the parameters exceeding one or more predetermined parameter thresholds.

18. The system of claim 17, wherein the communication module is further configured to transmit in the intermediate data packet an alarm signal to the transportation asset control center whenever a change in a location associated with the transportation asset exceeds a predetermined location threshold value.

19. A method for monitoring of a transportation asset over a communication network, using a computing system including sensors that collect operational data, a memory that stores the operational data, and machine instructions, the method comprising:

forming, by the computing system, data packets, associated with the transportation asset;

transforming, by the computing system, the data packets into electrical signals and discretely real time transmitting electrical signals to the transportation asset control center;

periodically receiving the data packets in the form of the electrical signals from the transportation asset;

visualizing the data packets on an electronic map;

wherein the data packets include support data packets and intermediate data packets, wherein the support data packets and intermediate data packets are aggregated into data arrays prior to transmission to the transportation asset control center, the support data packets including all absolute sensor-provided operational data related to the transportation asset, including coordinates of the transportation asset, a state of individual sub-systems associated with the transportation asset, and a full current date and time, wherein the support data packets are transmitted regardless of a state of the transportation asset; and wherein the formation of the intermediate packets is not triggered unless one or more predetermined parameters thresholds are exceeded, the intermediate data packets including the time increase and one or more over-time differences of changes in values of parameters associated with the state of the transportation asset; and wherein the intermediate data packets include only relative sensor-provided data in relation to the absolute sensor-provided data transmitted in the support data packet.

* * * * *